US008300557B2

(12) United States Patent
Sekaran et al.

(10) Patent No.: US 8,300,557 B2
(45) Date of Patent: Oct. 30, 2012

(54) BREAKOUT ROOMS IN A DISTRIBUTED CONFERENCING ENVIRONMENT

(75) Inventors: Dhigha D. Sekaran, Redmond, WA (US); Kenneth Wolfe, Redmond, WA (US); Doug Wyatt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1199 days.

(21) Appl. No.: 11/789,895

(22) Filed: Apr. 26, 2007

(65) Prior Publication Data

US 2008/0267095 A1  Oct. 30, 2008

(51) Int. Cl.
*H04L 12/16* (2006.01)
(52) U.S. Cl. ........................................ 370/260; 370/270
(58) Field of Classification Search ........... 370/260–271
See application file for complete search history.

(56) References Cited

U.S. PATENT DOCUMENTS

| | | | | |
|---|---|---|---|---|
| 5,812,653 | A * | 9/1998 | Jodoin et al. | 379/205.01 |
| 6,404,873 | B1 * | 6/2002 | Beyda et al. | 379/202.01 |
| 6,989,856 | B2 * | 1/2006 | Firestone et al. | 348/14.09 |
| 7,027,577 | B2 | 4/2006 | Gourraud et al. | |
| 7,127,487 | B1 * | 10/2006 | Wang et al. | 709/204 |
| 7,817,584 | B2 * | 10/2010 | Campbell et al. | 370/261 |
| 2002/0126626 | A1 * | 9/2002 | Singh et al. | 370/260 |
| 2004/0114603 | A1 * | 6/2004 | Suhail et al. | 370/395.5 |
| 2005/0094621 | A1 | 5/2005 | Acharya et al. | |
| 2005/0181872 | A1 | 8/2005 | Acharya et al. | |
| 2005/0259803 | A1 * | 11/2005 | Khartabil | 379/202.01 |
| 2006/0181608 | A1 * | 8/2006 | Knappe et al. | 348/14.09 |
| 2006/0233120 | A1 * | 10/2006 | Eshel et al. | 370/260 |
| 2007/0091830 | A1 * | 4/2007 | Coulas et al. | 370/260 |
| 2007/0143103 | A1 * | 6/2007 | Asthana et al. | 704/200 |
| 2007/0281680 | A1 * | 12/2007 | Raju et al. | 455/422.1 |
| 2007/0299710 | A1 * | 12/2007 | Haveliwala | 705/8 |
| 2007/0300165 | A1 * | 12/2007 | Haveliwala | 715/758 |

FOREIGN PATENT DOCUMENTS

EP    1388997 A1    2/2004

OTHER PUBLICATIONS

"Conferencing Scenarios", Date: Nov. 2003, http://tools.ietf.org/pdf/draft-ietf-xcon-conference-scenarios-00.pdf.
"Elluminate Live! Enterprise Edition", http://www.elluminate.com/enterprise_edition.jsp, Feb. 2007.
"Web Conferencing", Date: 2007, http://www.ivci.com/web_conferencing_index.html.
Singh, et al., "Centralized Conferencing using SIP", http://www1.cs.columbia.edu/~kns10/publication/sipconf.pdf, Apr. 2007.

* cited by examiner

*Primary Examiner* — Hong Cho

(57) ABSTRACT

Architecture that facilitates management and control of sidebar sessions (or breakout rooms) in a distributed conferencing environment. Distributed frontends (or MCUs) are provided for multi-party access into a main conferencing session. In one implementation, the main session can then be partitioned to provide one or more sidebar sessions for side conferencing. The sidebar sessions can all be contained on a single MCU or distributed across multiple MCUs. The leader of the main session can then freely roam among the sidebar sessions of a single MCU or among the sessions on the distributed MCUs. The protocol can be SIP-based, and also or alternatively use C3P commands for creating (or adding) a sidebar session, modifying the sidebar, moving users to and from a sidebar, and deleting the sidebar session.

20 Claims, 11 Drawing Sheets

BREAKOUT ROOMS IN A DISTRIBUTED CONFERENCING ENVIRONMENT

BACKGROUND

Technological advances in computing devices and networking continue to provide greater access to a wide variety of information and services allowing access from virtually anywhere in the world. Virtual offices are becoming more commonplace since the work that needs to be done can be performed from most locations. Businesses recognize the importance of meetings to effectively address customer needs and to move product development forward, for example. However, bringing users together to conduct business from the many remote locations at which the user could be and supporting the many available communications devices and media types remains a challenging prospect.

Conferencing can be an effective means by which employees of a corporate enterprise, for example, can conduct meetings. However, given the location and connection capabilities at any point in time, participants may want to join via different media types. With the advances in storage and computing power of portable wireless computing devices, users now are capable of interacting with many types of disparate data types such as images, video clips, audio data, and textual data, for example. This is facilitated by several types of devices that users can now employ and with which to connect to the session. For example, one user can participate by audio/video from a conference room, another by voice via a desktop computer, and yet another by text input using a cell phone.

During the course of the conference session, however, it can be more productive and beneficial to split the participants into smaller groups such that topics can be addressed in more focused groups. Thereafter, the groups can then rejoin the main conference session and provide the information needed. However, conventional conferencing architectures lack the framework for creating such a session experience in a seamless manner and for distributed implementations.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a system and protocol that facilitates management and control of sidebar sessions (or breakout rooms) in a distributed conferencing environment. A session leader can create breakout rooms (or side conferences or "sidebars") and assign individuals or groups to the breakout rooms. A group can be assigned to a breakout room for interacting and working with each other on specific topics of interest. The breakout rooms can then be terminated by the leader when it is time to bring the attendees back to the main room (or session). The attendees can have a seamless join and leave experience in the breakout rooms. Additionally, the leader can roam among the rooms, assign content to breakout rooms, move content from breakout rooms into the main room, etc.

In support thereof, the system includes distributed frontends (or multi-point control units or MCUs) for multi-party access into a main conferencing session as well as sidebar sessions. The frontends facilitate user participation in the sessions via different types of media access, for example, audio, video, text messaging, etc.

In one implementation, the main session can be partitioned to provide one or more sidebar sessions for side conferencing. The sidebar sessions can all be contained on a single MCU or distributed across multiple MCUs. The leader of the main session can then freely roam among the sidebar sessions of a single MCU or among the sessions on the distributed MCUs. The protocol can be SIP-based, and/or use centralized conference control protocol (C3P) commands for creating (or adding) a sidebar session, modifying the sidebar, moving users to and from a sidebar, and deleting the sidebar session. In another implementation, multiple MCUs can be allocated for corresponding sidebar sessions.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
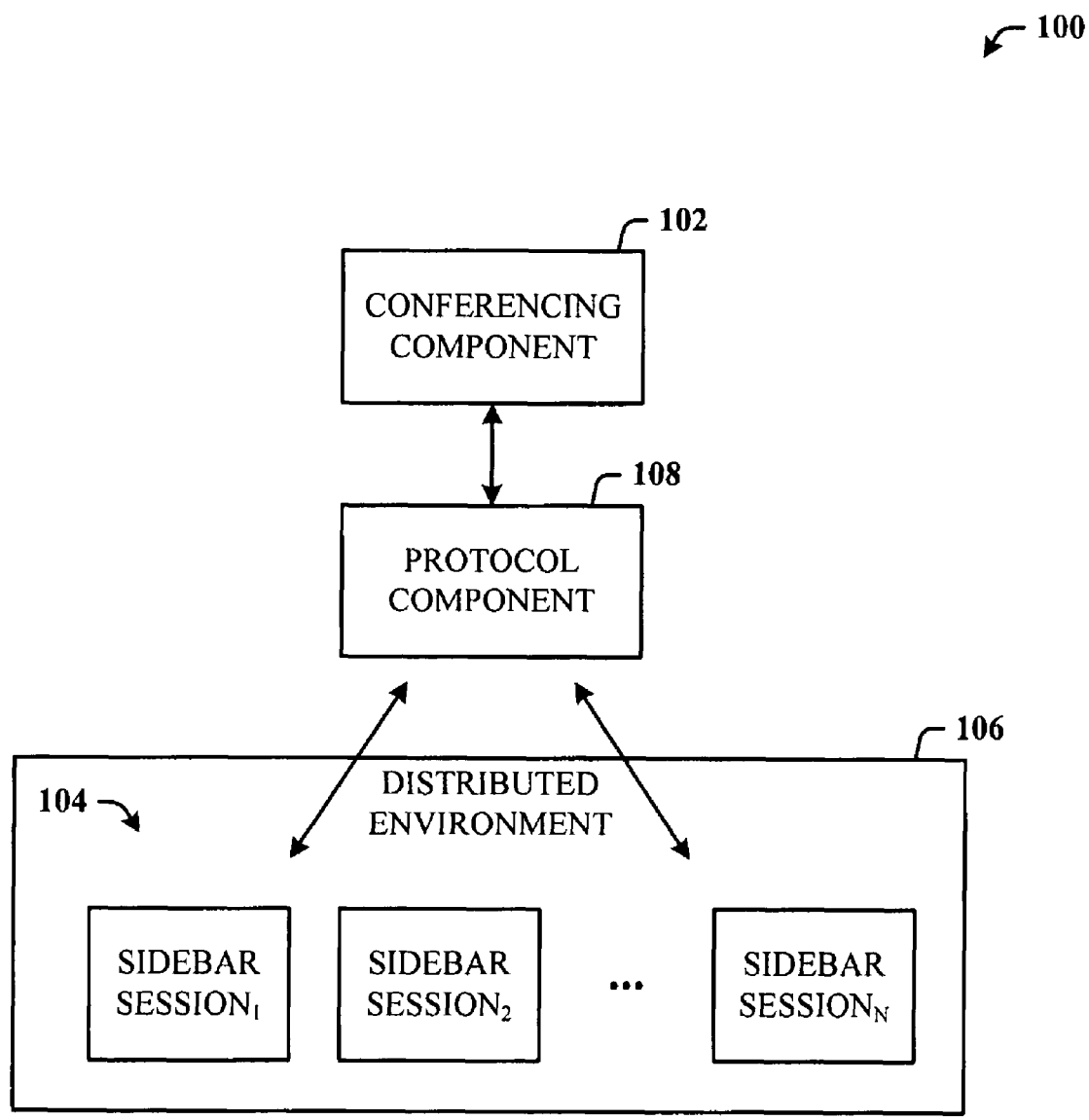
FIG. 1 illustrates a computer-implemented conferencing system.

As a brief description of conferencing in this context, a user who seeks to start a new conference launches a client application that connects and communicates to a web service (referred to as a focus factory). To create a new conference means creating and configuring a focus instance. The job of the focus factory is to return an identifier or address (e.g., a URI or uniform resource identifier) of the focus instance back to the client. The focus/conference URI is constructed to include a unique conference identifier, unique server identifier, and the domain which hosts the conference.

The focus (or focus instance) is a session (e.g., SIP) endpoint that represents a conference, and is responsible for managing the state of the conference, enforcing security, managing roles and privileges and providing conference state updates to the clients. The focus instance runs on a conferencing pool, and allows clients to connect to any frontend in the pool, thereby allowing better availability, distribution of load and better scaling. The focus factory can be collocated with the focus on a communications server, or factories/focuses on groups of servers. Each conferencing pool can be looked at as a focus factory.

A frontend system is called a multi-point control unit (MCU), and responsible for a specific media type such as audio/video, data collaboration, messaging (e.g., chat), etc. An MCU factory is an entity responsible for allocating an MCU to a conference for a specific media type.

A client can create a conference by connecting to a known focus factory web URI and using the exposed web interfaces to create a focus. After the successful creation of the focus the webpage points the client to the necessary information to launch the conference client to dial-in to the conference. The client passes all the information that it needs regarding the conference, media types, privileges, participants as part of a session protocol request to the focus factory. The focus factory then creates the focus instance and redirects the client to the focus instance using the generated focus URI.

Upon receiving an invite message from the client, the focus factory creates the focus and returns the focus information to the client. The focus, just like the focus factory, can be a SIP endpoint represented by an application. The focus factory redirects the received invite request to the focus, allowing the focus to become the endpoint that performs the media negotiation with the client.

A focus instance runs on each of the frontends (e.g., MCUs) of a pool at the same time allowing clients to connect to any frontend in the pool, and allowing distribution of load and better scaling. The focus state that needs to be shared among focus instances for a conference is kept in a database. This data contains the roster, roles and privileges, media types and MCU identities, etc. Each focus instance handles connection state for clients that are connected to the particular frontend on which the focus instance is running. Since each focus instance can be a SIP endpoint, these connections are SIP dialogs. When a focus URI is handed to a client, a part of that URI is the conference ID, a number that is generated by the database engine referring to a conference record in the database. The database record contains data indicating how long the record should be kept in the database as well as other information about the conference.

A SIP conference is an association of SIP user agents (or conference participants) with a central point (a conference focus), where the focus has direct peer-wise relationships with the participants by maintaining a separate SIP dialog with each. The focus is a SIP user agent that has abilities to host SIP conferences including creation, maintenance, and manipulation using SIP call control means and potentially other non-SIP means. The conference focus maintains the correlation among the conference's dialogs internally. The conference focus can be implemented either by a participant or by a separate application server.

The disclosed architecture is a system and protocol that facilitates management and control of sidebar sessions (or breakout rooms) in a distributed conferencing environment. Distributed frontends (or MCUs) are provided for multi-party access into a main conferencing session. In one implementation, the main session can then be partitioned to provide one or more sidebar sessions for side conferencing. The sidebar sessions can all be contained on a single MCU or distributed across multiple MCUs. The leader of the main session can then freely roam among the sidebar sessions of a single MCU or among the sessions on the distributed MCUs. The protocol can be SIP-based, and/or use centralized conference control protocol (C3P) commands for creating (or adding) a sidebar session, modifying the sidebar session, moving users to and from a sidebar session, and deleting the sidebar session. The breakout room feature is provided in multiple identical, leaderless, conference servers together which form a distributed conferencing system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented conferencing system 100 for sidebar session management. The system 100 includes a conferencing component 102 for creating side conference (or sidebar) sessions 104 (denoted SIDEBAR SESSION$_1$, SIDEBAR SESSION$_2$, ..., SIDEBAR SESSION$_N$, where N is a positive integer) in a distributed conferencing environment 106. The system 100 also includes a protocol component 108 that provides a suitable session protocol for coordinating session control across the distributed environment 106 using a session protocol. In one implementation, the session protocol is SIP (session initiation protocol). In another implementation, C3P (also referred to as CCCP) is employed alternatively or in combination with SIP. However, it is to be appreciated that alternatively, other media session protocols can be employed.

The system 100 supports multiple different sidebar sessions 104 over a distributed pool of frontend systems (also referred to as MCUs or remote control units) that accommodate session participants for hosting the sessions and/or connecting to the sessions via devices or systems using at least one of data, audio media, video media, or messaging media, for example.

The protocol component 108 facilitates the seamless and transparent (to the user) operation of creating sidebar sessions, moving participants into and out of the sidebar sessions, allowing the leader to move among the main and sidebar sessions, and close the sidebar sessions, as desired.

Figure 2:
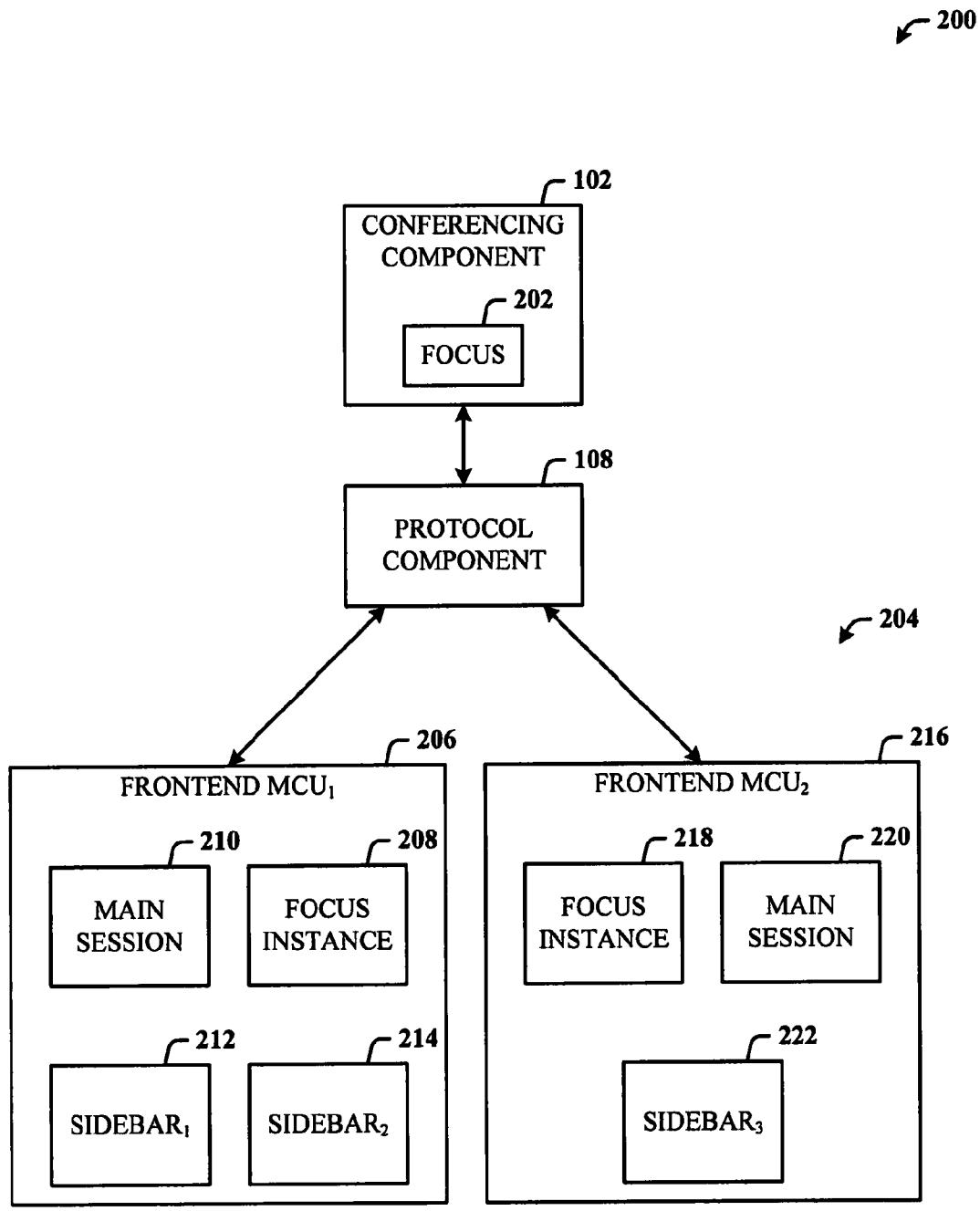
FIG. 2 illustrates a more detailed system for managing sidebar sessions in a distributed environment.

FIG. 2 illustrates a more detailed system 200 for managing sidebar sessions in a distributed environment. The conferencing component 102 can include a focus 202 (or central control or interface) for managing or providing access to focus instances on distributed frontends 204. The protocol component 108 facilitates SIP communications between the conferencing component 102 and the frontends 204. For example, a first frontend 206 (denoted FRONTEND MCU$_1$) is a distributed remote control unit that includes a first focus instance 208 for management of local sessions: a first main session 210, a first sidebar session 212 and a second sidebar session 214. A second frontend 216 includes a second focus instance 218, a second main session 220, and a third sidebar session 222.

The first frontend 206 is running the main session 210 and the two sidebar sessions (212 and 214). The first focus 208 maintains the session state for the sessions running on the first frontend 206. The focus 202 facilitates connecting users to the sessions (210, 212 and 214) of the first frontend 206 as the users login via a web service (e.g., as part of the conferencing component 102), for example. In other words, users can create and be routed to the second main session 220 via the focus 202 and second focus instance 218. Additionally, the second main session 220 can be partitioned such that the third sidebar session 222 is automatically created and participants of the second main session 220 are moved to the third sidebar session 222. When the users are moved out of the third sidebar session 222 to the second main session 220, the third sidebar session 222 can be configured to close automatically.

As indicated above, the plurality of distributed frontend unit facilitate connecting participants to the sessions via at least one of data, audio media, video media, or messaging media.

Figure 3:
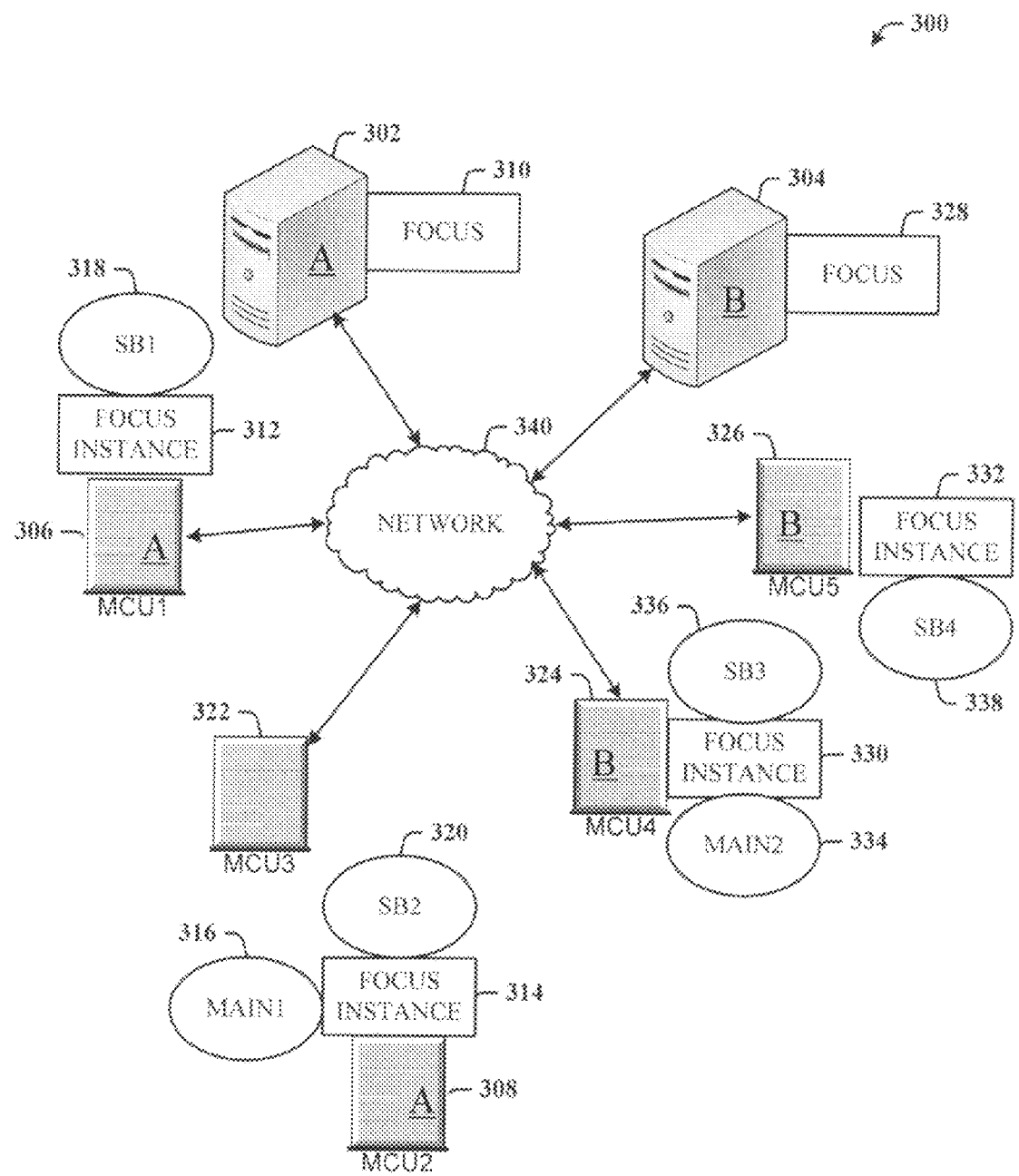
FIG. 3 illustrates a multi-server distributed conferencing environment in accordance with an alternative embodiment.

FIG. 3 illustrates a multi-server distributed conferencing environment 300 in accordance with an alternative embodiment. The system 300 includes a first communications server 302 and a second communications server 304 for sidebar conferencing management in a distributed environment. The first server 302 is associated with a session A, and has allocated from a pool of remote control units a first MCU 306 and a second MCU 308. The first server 302 includes a first focus 310 for managing and maintaining session state for the associated sessions via focus instances in the allocated frontends (306 and 308). For example, a first focus instance 312 is created in the first MCU 306 and a second focus instance 314 is created in the second MCU 308. A first main session 316 is created in the second MCU 308. The first main session 316 can be partitioned to be associated with two sidebar sessions: first sidebar session 318 on the first MCU 306 and a second sidebar session 320 on the second MCU 308.

As session users access the first server 302, the users can be routed to the first main session 316, and thereafter, moved to appropriate sidebar sessions (318 and 320). It is to be appreciated that partitioning of the main session does not collapse the main session to make the sidebar sessions, but maintains the main session while the sidebar sessions are in-process. The focus 310 and focus instances (312 and 314) facilitate creating unique identifiers for the sessions (main and sidebar) and routing information for routing the users to the correct sessions. Moreover, the focus instances (312 and 314) facilitate the presentation of session state to the session participants to keep the participants informed as to other participants. For example, a sidebar participant in the first sidebar session 318 on the first MCU 306 can be made aware of the status of a sidebar session participant in the second sidebar session 320 of the second MCU 308. When the sidebar sessions (318 and 320) are terminated, the participants are moved back to the main session 316 on the second MCU 308. At this time, the first MCU 306 could be deallocated back to the pool of frontend units (e.g., such as a third MCU 322).

The second server 304 is associated with a session B, and has allocated from a pool of remote control units a fourth MCU 324 and a fifth MCU 326. The second server 304 includes a second focus 328 for managing and maintaining session state for the associated sessions via focus instances in the allocated frontends (324 and 326). For example, a third focus instance 330 is created in the fourth MCU 324 and a fourth focus instance 332 is created in the fifth MCU 326. A second main session 334 is created in the fourth MCU 324. The second main session 334 can be partitioned to be associated with two sidebar sessions: a third sidebar session 336 on the fourth MCU 324 and a fourth sidebar session 338 on the fifth MCU 326.

Thus, the multi-server environment 300 facilitates multiple main sessions and sidebar sessions via distributed remote control units over a network 340 and for different types of media connection (e.g., text, audio, video, etc.). Moreover, MCUs can be allocated and deallocated as needed to meet demand and for dynamic scaling.

Figure 4:
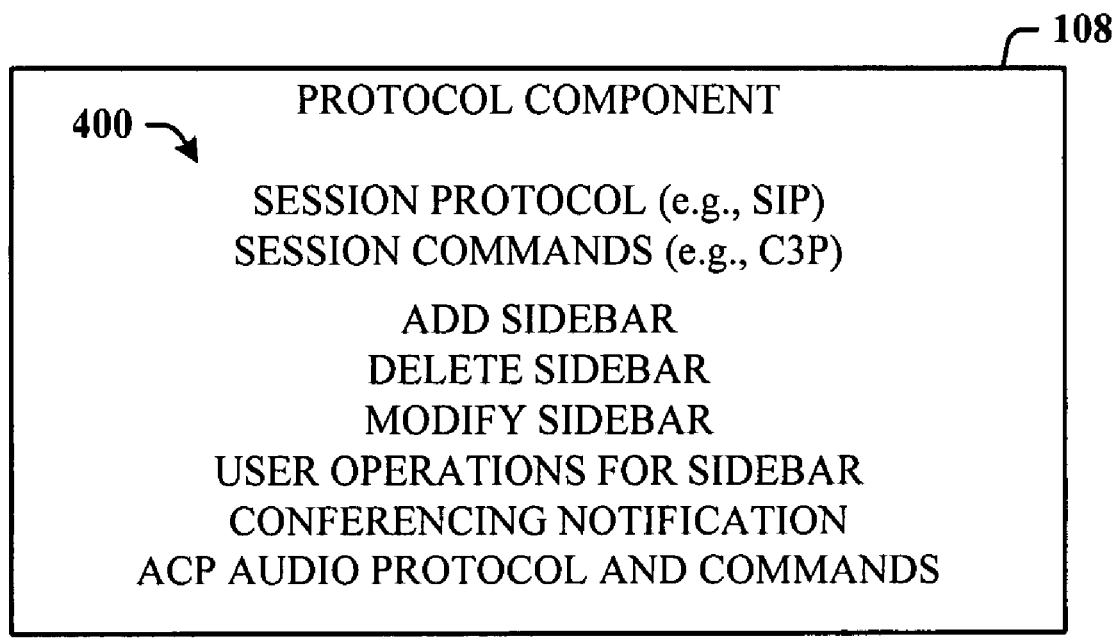
FIG. 4 illustrates the protocol component and exemplary protocol functionality for supporting distributed sessions.

FIG. 4 illustrates the protocol component 108 and exemplary protocol functionality for supporting distributed sessions. The session protocol can be SIP used in combination with C3P commands, for example. Sidebar functionality for distributed control and management includes the capability to add (or create) a sidebar session, delete a sidebar session, modify a sidebar session, and perform user operations (e.g., move users among sessions). Additionally, conferencing notifications are provided, as well as support for ACP audio on the frontend systems for session support.

Figure 5:
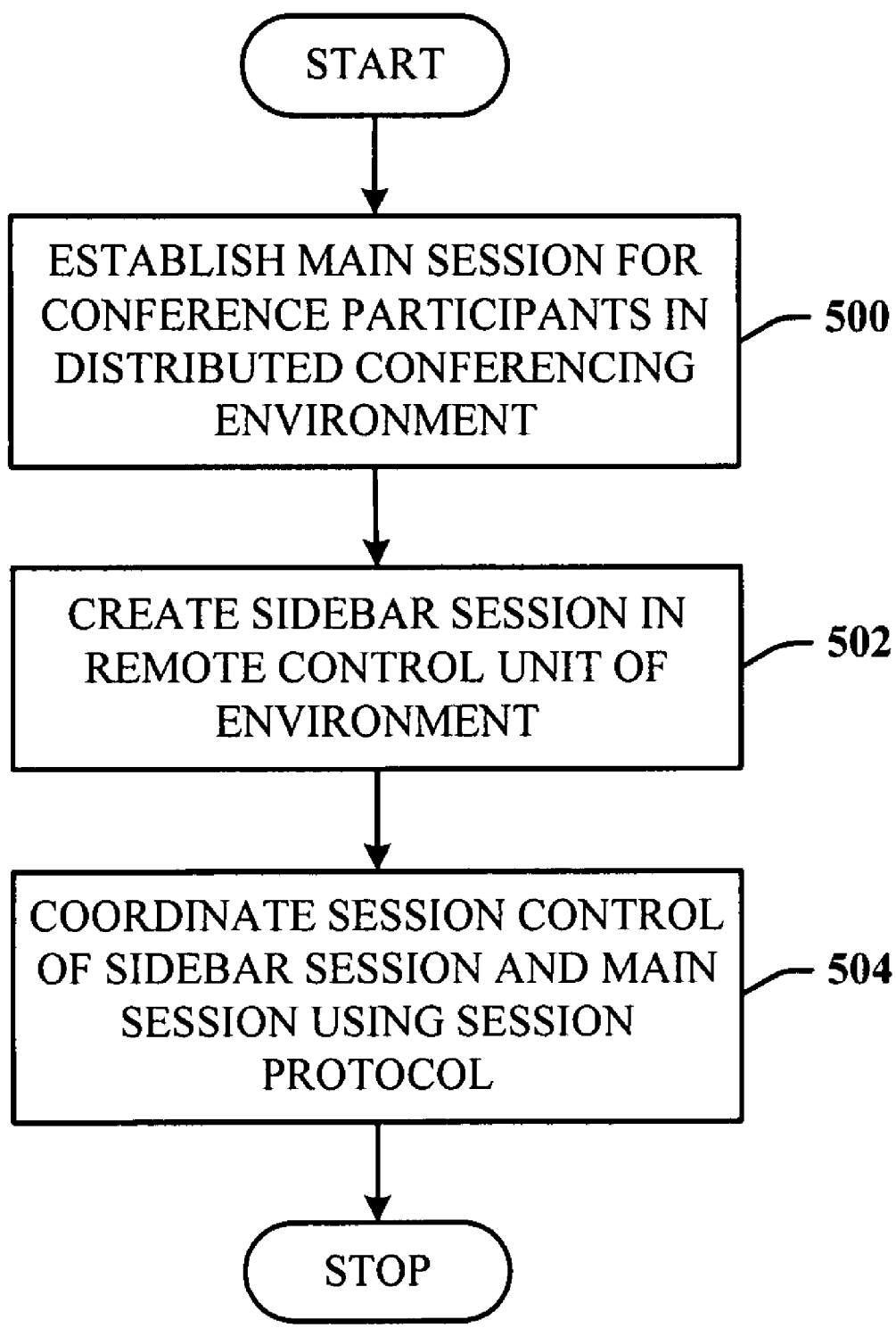
FIG. 5 illustrates a method of sidebar management in a distributed conferencing environment.

FIG. 5 illustrates a method of sidebar management in a distributed conferencing environment. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 500, a main session for conference participants is established in a distributed conferencing environment. At 502, a sidebar session is created in a remote control unit (e.g., an MCU). At 504, session control of the sidebar session and the main session is coordinated (e.g., automatically and transparently) to the users using a session protocol (e.g., SIP-based).

Figure 6:
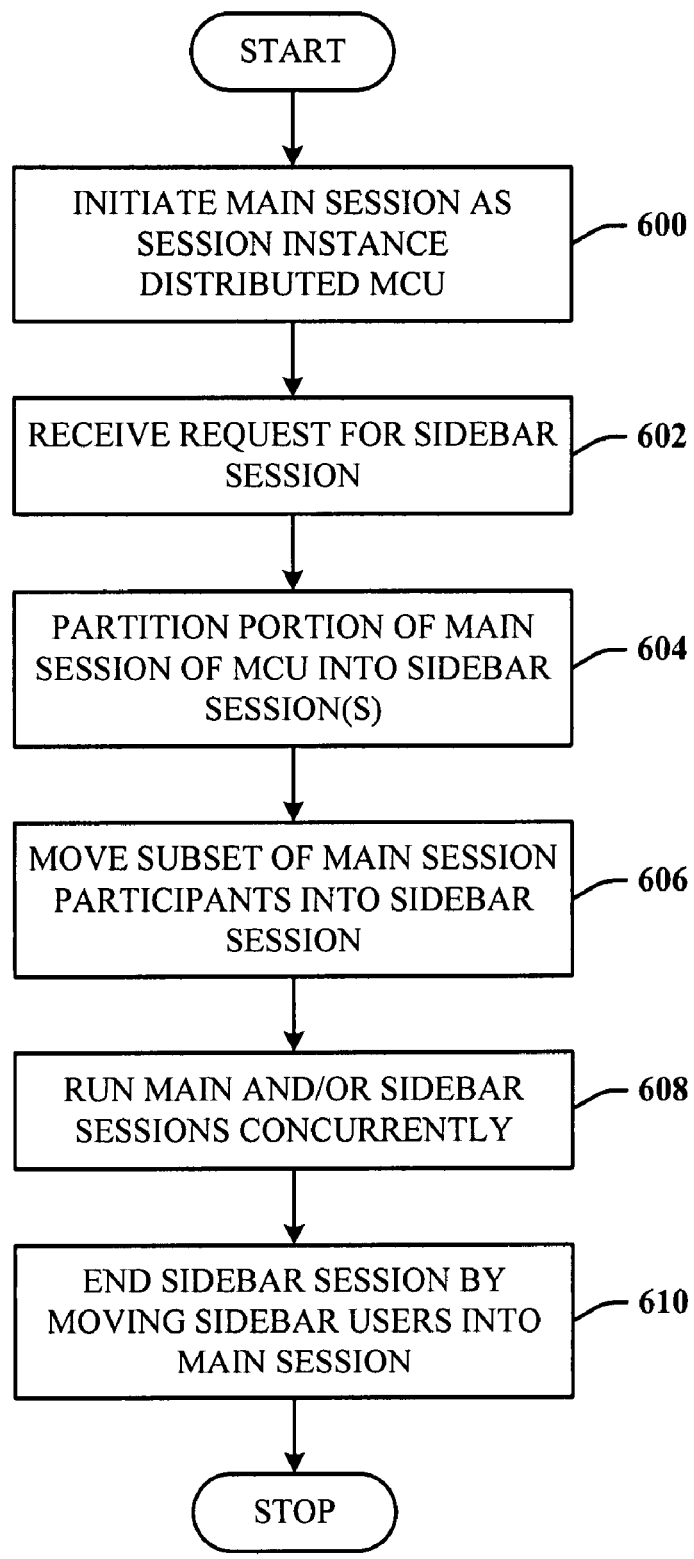
FIG. 6 illustrates a method of creating a sidebar session by partitioning the main session.

FIG. 6 illustrates a method of creating a sidebar session by partitioning the main session. At 600, a main session is initiated as a session instance in a distributed MCU. At 602, a request for a sidebar session is received. At 604, a portion of the main session is partitioned to create the sidebar session. In other words, not all main session participants need to be moved to the sidebar, but only a subset thereof, as indicated at 606. At 608, the main and sidebar sessions are run concurrently. At 610, the sidebar session is ended by moving all sidebar session users out (e.g., back to the main session).

Figure 7:
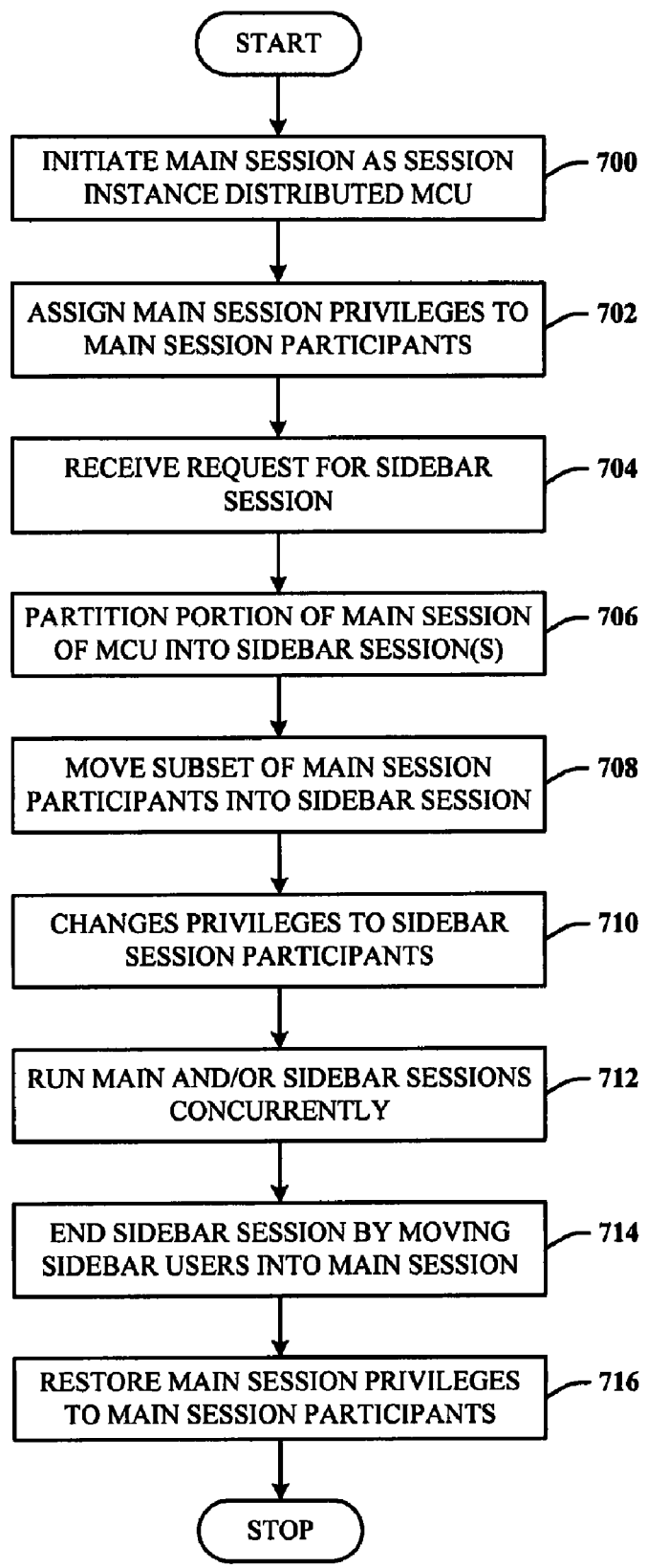
FIG. 7 illustrates a method of managing user privileges according to session participation.

FIG. 7 illustrates a method of managing user privileges according to session participation. At 700, a main session is initiated as a session instance in a distributed MCU. At 702, privileges are assigned to the main session participants. At 704, a request for a sidebar session is received. At 706, a portion of the main session is partitioned for one or more sidebar sessions. At 708, a subset of the main session users is moved to the sidebar session. At 710, privileges for the sidebar participants are changed (e.g., elevated for more control). At 712, the main and sidebar session are then run concurrently. At 714, the sidebar session is ended by moving all sidebar users out of the session. At 716, main session privileges are restored to the main session participants.

Figure 8:
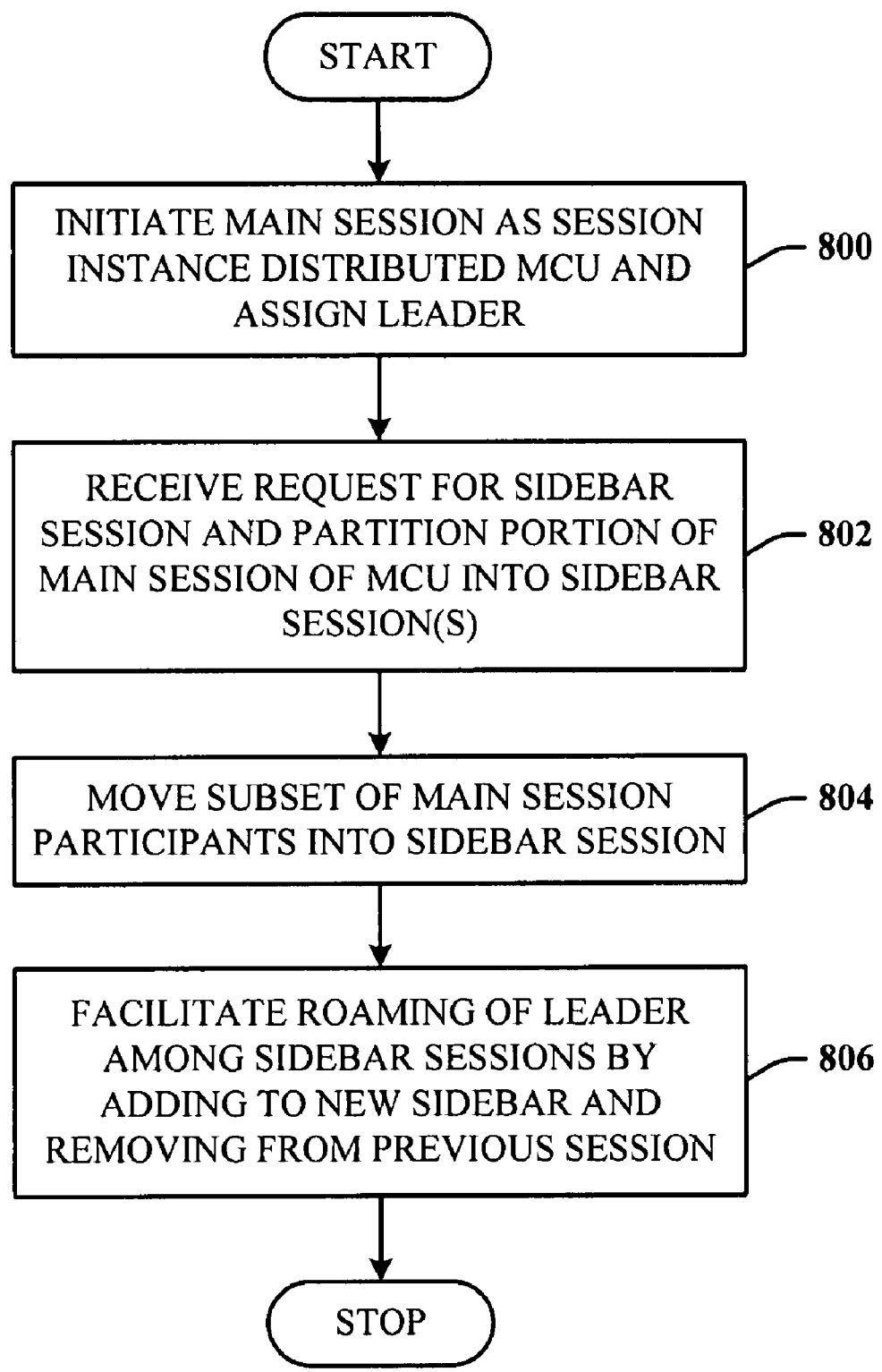
FIG. 8 illustrates a method of roaming sidebar sessions.

FIG. 8 illustrates a method of roaming sidebar sessions. At 800, a main session is initiated as a session instance in a distributed MCU, and a session leader is assigned. At 802, a request for a sidebar session is received and the sidebar sessions partitioned and created. At 804, participants are moved into the sidebar sessions. At 806, the leader roams the sidebar sessions as well as the main session.

Figure 9:
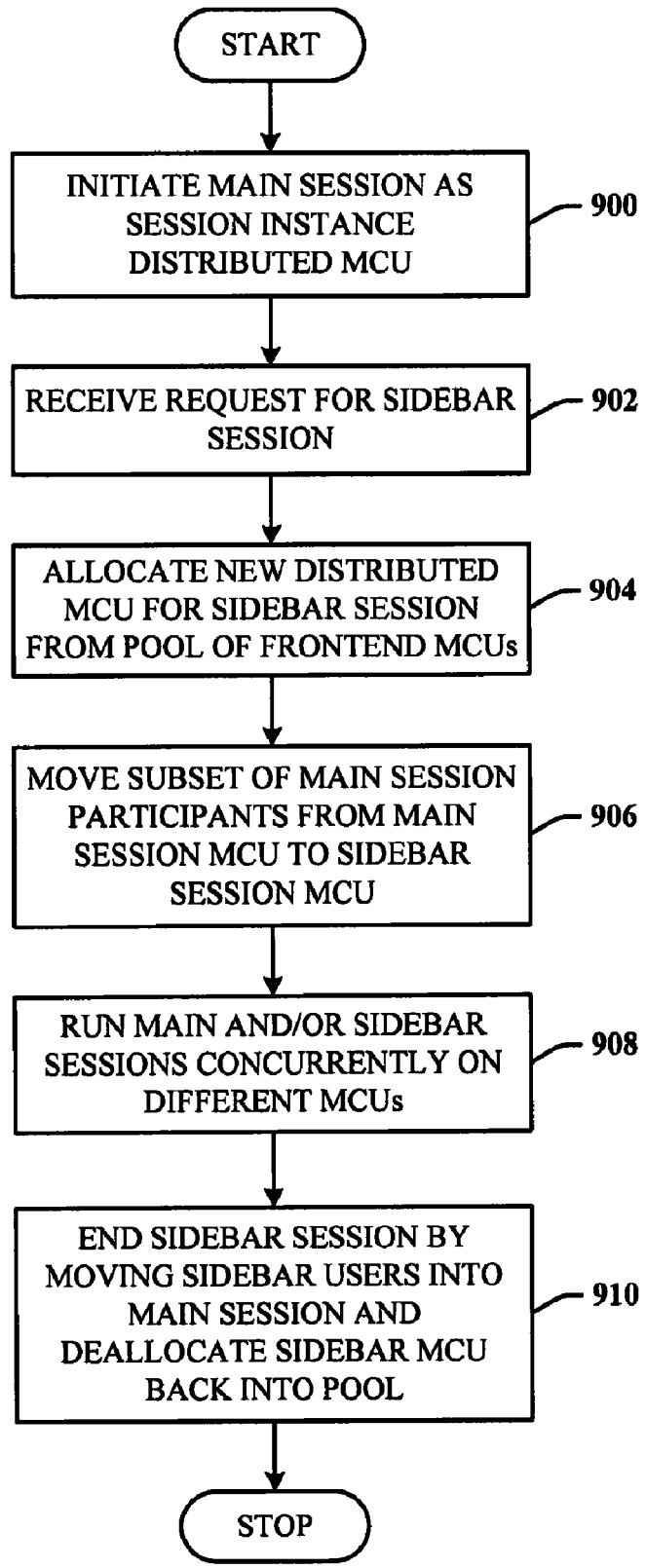
FIG. 9 illustrates a method of managing sidebar sessions over multiple MCUs.

FIG. 9 illustrates a method of managing sidebar sessions over multiple MCUs. At 900, a main session is initiated as a session instance in a distributed MCU. At 902, a request is received for a sidebar session. At 904, a new distributed MCU is allocated from a pool of MCUs for the sidebar session. At 906, a subset of the main session users is moved to the sidebar session MCU. At 908, the main and sidebar session are run concurrently on different MCUs. At 910, the sidebar session is ended by moving the sidebar users into the main session and deallocating the sidebar MCU back into the pool.

Following is a detailed description of SIP-based messages and C3P commands that can be used for session management in the disclosed distributed conferencing environment. Commands (e.g., C3P) are provided for creation of the sidebar session (also referred to as "a sidebar"), deletion of the sidebar, and user operations (e.g., assigning users to sidebars from a main session and moving users back to the main session (or room)).

The sidebar information in the conference is communicated to all the participants (also called watchers, in contrast to the leader) of the conference state. In the disclosed architecture this notification can happen in two prongs: from an MCU to the focus, and the other prong from the focus to the client.

There are various ways in which the commands can be implemented. One option utilizes realtime communications (RTC). The client addresses the command to the focus, which from the focus the command gets forked. In other words, the client sends a sidebar command (e.g., C3P) to the focus and the focus fans out the command to all the MCUs allotted for the conference. For example, the client can send an AddSidebar command to the focus such that the focus fans the command out to an A/V MCU and data MCU.

The success or failure of the response can be determined by the client based on the notification received from the focus or the focus can aggregate the responses from multiple MCUs and present the aggregate to the client. Another option is that the client issues the commands directly to the MCUs. For example, if the conference session includes two allotted MCUs, the client sends each of the sidebar commands (e.g., C3P) to each of the MCUs. This makes the success or failure of the command more deterministic.

Following are commands (e.g., C3P) that can be used are AddSidebar (used for creation of the sidebar), DeleteSidebar (used for deletion of the sidebar), ModifySidebar (used for modifying sidebar state), and MoveUserToSidebar (add/remove/move users in sidebars).

The AddSidebar command is used by the client to create a sidebar and create state in the focus and MCUs to represent the new sidebar (breakout room), but is not used for moving a user into that breakout room. This command allows the focus and MCUs to prepare for future sidebar operations including but not limited to, preparing internal data structures.

The AddSidebar command is first processed by the focus to create the sidebar element in the conferencing document. The command is then forked by the focus to all MCUs in the conference. Each MCU will independently succeed or fail and send this response to the focus. The focus in turn aggregates these responses into a C3P response to be sent to the issuing client.

Each sidebar has a unique identifier as well as a user-friendly display name. The unique ID is unique for each AddSidebar command. Duplicates are rejected (with a failure response) by the focus.

The DeleteSidebar command is used by a client to delete the sidebar. On receipt of the DeleteSidebar command the focus first removes the representation of the sidebar in the focus from the conference state representation, and forks the command to all the MCUs. The MCUs that receive the forked commands delete the sidebar representation in the sidebar and notify the focus accordingly. Once the sidebar does not have any focus or MCU representation the focus deletes the sidebar entry.

Deleting a sidebar implicitly moves all users in that session room back to the main room. This means that the MCU receiving the forked DeleteSidebar command from the focus should be ready to modify the media state of multiple users (all users in that breakout room).

The ModifySidebar command is used to change the sidebar name and other sidebar properties. The command processing for the ModifySidebar command is the same as for AddSidebar.

The MoveUserToSidebar command specifies a source room as well as a destination room. This command allows moving a user from the main room to a sidebar (or breakout) room, moving a user between breakout rooms, and moving a user from a breakout room back to the main room. In one implementation, a user can be present in only one sidebar at a time. In an alternative implementation, a user can be present in multiple sidebars at a time. By default, when a user first joins a conference the user is automatically placed in the main room (not a sidebar). When moving a user to the sidebar, the media elements from the endpoint elements in the main conference room are also removed. In an alternative implementation, the main room elements can be temporarily marked as inactive.

The conferencing package provides at least two ways in which a sidebar can be represented in a notification document: sidebars-by-ref and sidebars-by-val. The sidebars-by-ref element contains a set of child elements each containing a sidebar conference URI. The recipient of the information can then subscribe to sidebar information independently from the main conference package subscription. Following is sample code for the sidebars-by-ref element.

```
<!--
    SIDEBARS BY REFERENCE
-->
<sidebars-by-ref state="partial">
    <entry>
        <uri>sips:conf233@example.com;grid=45</uri>
        <display-text>sidebar with Carol</display-text>
    </entry>
    <entry>
        <uri>sips:conf233@example.com;grid=21</uri>
        <dispay-text>private with Peter</display-text>
    </entry>
</sidebars-by-ref>
```

The sidebars-by-val element contains a set of child elements each containing information about a single sidebar. By using this element of conference-type, the server can include a full or a partial description of each sidebar (as a sub-conference) in the body of the main conference document. Following is sample code for the sidebars-by-val element.

```
<!--
    SIDEBARS BY VALUE
-->
<sidebars-by-val state="partial">
    <entry entity="sips:conf233@example.com;grid=77"
        state="partial">
        <users>
            <user entity="sip:bob@example.com"/>
            <user entity="sip:mark@example.com"/>
            <user entity="sip:dan@example.com"/>
        </users>
    </entry>
</sidebars-by-val>
```

The sidebars-by-val representation avoids having another subscription dialog for each sidebar. This simplifies the logic both on the client, focus, and MCU as well.

When a C3P request creates a sidebar, the focus creates a sidebar containing a sidebar description, and then tells the MCUs to create the sidebar as well. When an MCU creates the sidebar the MCU publishes the existence of the sidebar in the sidebar level MCU extensibility blob.

Within sidebar elements, endpoint elements are just containers for zero or more media elements, and user elements are containers for one or more such endpoint elements. Every user within a sidebar should have an entity attribute matching a user in the main conference, and every endpoint child of such a user should have an entity attribute matching an endpoint child of the corresponding user in the main conference (or main room). All other attributes or children of users (e.g., display-text, etc.) and of endpoints (e.g., status, joining-method, etc.) belong only in the main conference elements.

When a C3P request moves a user into a sidebar, the focus creates a user containing a focus endpoint (with no media children) within the sidebar element, and then tells the MCUs to move the user. When an MCU changes MCU mixing rules to move a user into a sidebar, the MCU creates an endpoint container with its media children (e.g., marked sendrecv) within the sidebar, and removes the media of the corresponding endpoint in the main conference.

When a C3P request moves a user out of a sidebar, the focus itself removes its focus endpoint from that user within the sidebar element, and then tells the MCUs to move the user. When an MCU changes the MCU mixing rules to move a user out of a sidebar, the MCU removes its endpoint element from the user in the sidebar, and adds media with sendrecv to the corresponding endpoint in the main conference.

The user elements within sidebars vanish when no corresponding endpoint children exist. This invariant works nicely because of the behavior of the focus endpoint. It also makes the situation clear if an MCU fails to move a user out of a sidebar.

Note that in one implementation a user (e.g., in the steady state, in normal operation) can only be in one place (e.g., main conference or sidebar) at a time. However, this is due only to a constraint imposed by the selected command set. As indicated previously, the system could be configured to allow the user to be in multiple sidebars simultaneously.

The client application can implement a policy to show the human user the participants in other sidebar rooms. When a user is in transit, the conference document can provide information to client application related displaying the intent as soon as the focus endpoint changes, and whether to wait for all the media to follow.

Following is an example of a typical sequence of conference document states, beginning with an empty sidebar called "Room 1". As the states changes, the C3P command will be shown, and the corresponding change in the conference state. Additions to the conference state due to changes are shown in underline and state removal shown in strikethrough (e.g., strikethrough).

```
<users>
  <user ... (Arthur)>
    <display-text>Arthur Dent</display-text>
    <endpoint ... (Arthur;focus)>
      <status>connected</status>
    </endpoint>
    <endpoint ... (Arthur;av)>
      <status>connected</status>
      <media ...><type>audio</type><status>sendrecv</status></media>
      <media ...><type>video</type><status>sendrecv</status></media>
    </endpoint>
    <endpoint ... (Arthur;data)>
      <status>connected</status>
      <media ...><type>data</type><status>sendrecv</status></media>
    </endpoint>
  </user>
</users>
<sidebars-by-val>
  <entry ... (Room 1)>
    <conference-description>
      <display-text>Breakout Room 1</display-text>
    </conference-description>
  </entry>
</sidebars-by-val>
```

Just after the focus receives a "move Arthur to Room 1" command:

```
<users>
  <user ... (Arthur)>
    <display-text>Arthur Dent</display-text>
    <endpoint ... (Arthur;focus)>
      <status>connected</status>
    </endpoint>
    <endpoint (Arthur;av)>
      <status>connected</status>
      <media ...><type>audio</type><status>sendrecv</status></media>
      <media ...><type>video</type><status>sendrecv</status></media>
    </endpoint>
    <endpoint (Arthur;data)>
      <status>connected</status>
      <media ...><type>data</type><status>sendrecv</status></media>
    </endpoint>
  </user>
</users>
<sidebars-by-val>
  <entry ... (Room 1)>
    ...
    <users>
      <user ... (Arthur)>
        <endpoint ... (Arthur;focus)/>
      </user>
    </users>
  </entry>
</sidebars-by-val>
```

After the A/V MCU has executed the request and notified the focus (but the data MCU has not):

```
<users>
  <user ... (Arthur)>
    <display-text>Arthur Dent</display-text>
    <endpoint ... (Arthur;focus)>
      <status>connected</status>
    </endpoint>
    <endpoint (Arthur;av)>
      <status>connected</status>
      <media ...><type>audio</type><status>sendrecv</status></media>
      <media ...><type>video</type><status>sendrecv</status></media>
    </endpoint>
    <endpoint (Arthur;data)>
      <status>connected</status>
      <media ...><type>data</type><status>sendrecv</status></media>
    </endpoint>
  </user>
</users>
<sidebars-by-val>
  <entry ... (Room 1)>
    <users>
      <user ... (Arthur)>
        <endpoint ... (Arthur;focus)/>
        <endpoint (Arthur;av)>
          <media ...>
```

```
            <type>audio</type><status>sendrecv</status>
          </media>
          <media ...>
            <type>video</type><status>sendrecv</status>
          </media>
        </endpoint>
      </user>
    </users>
  </entry>
</sidebars-by-val>
```

After hearing from the data MCU, and Arthur is now completely moved to Room 1:

```
<users>
  <user ... (Arthur)>
    <display-text>Arthur Dent</display-text>
    <endpoint ... (Arthur;focus)>
      <status>connected</status>
    </endpoint>
    <endpoint (Arthur;av)>
      <status>connected</status>
    </endpoint>
    <endpoint (Arthur;data)>
      <status>connected</status>
      <media ...><type>data</type><status>sendrecv</status></media>
    </endpoint>
  </user>
</users>
<sidebars-by-val>
  <entry ... (Room 1)>
    <users>
      <user ... (Arthur)>
        <endpoint ... (Arthur;focus)/>
        <endpoint (Arthur;av)>
          <media...><type>audio</type><status>sendrecv</status></media>
          <media...><type>video</type><status>sendrecv</status></media>
        </endpoint>
        <endpoint (Arthur;data)>
          <media ...>
            <type>data</type><status>sendrecv</status>
          </media>
        </endpoint>
      </user>
    </users>
  </entry>
</sidebars-by-val>
```

Just after the focus receives a "move Arthur from Room 1 to the main conference" command:

```
<users>
  <user ... (Arthur)>
    <display-text>Arthur Dent</display-text>
    <endpoint ... (Arthur;focus)>
      <status>connected</status>
    </endpoint>
    <endpoint (Arthur;av)>
      <status>connected</status>
    </endpoint>
    <endpoint (Arthur;data)>
      <status>connected</status>
    </endpoint>
  </user>
</users>
<sidebars-by-val>
  <entry ... (Room 1)>
    <users>
      <user ... (Arthur)>
        <endpoint...(Arthur; focus)/>
        <endpoint (Arthur;av)>
          <media ...><type>audio</type><status>sendrecv</status></media>
          <media ...><type>video</type><status>sendrecv</status></media>
        </endpoint>
        <endpoint (Arthur;data)>
          <media ...><type>data</type><status>sendrecv</status></media>
        </endpoint>
      </user>
    </users>
  </entry>
</sidebars-by-val>
```

The data MCU has executed the request, but the A/V MCU has not:

```
<users>
  <user ... (Arthur)>
    <display-text>Arthur Dent</display-text>
    <endpoint ... (Arthur;focus)>
      <status>connected</status>
    </endpoint>
    <endpoint (Arthur;av)>
      <status>connected</status>
    </endpoint>
    <endpoint (Arthur;data)>
      <status>connected</status>
      <media...><type>data</type><status>sendrecv</status></media>
    </endpoint>
  </user>
</users>
<sidebars-by-val>
  <entry ... (Room 1)>
    <users>
      <user ... (Arthur)>
        <endpoint (Arthur;av)>
          <media...><type>audio</type><status>sendrecv</status></media>
          <media...><type>video</type><status>sendrecv</status></media>
        </endpoint>
        <endpoint(Arthur; data)>
          <media...><type>data</type><status>sendrecv</status></media>
        </endpoint>
      </user>
    </users>
  </entry>
</sidebars-by-val>
```

The focus may not filter the roster on a per sidebar basis. The changes in sidebar rosters can be reported by the focus to participants that are not part of the sidebar.

Following is a description of a minimal C3P protocol for implementing breakout rooms with ACP (audio control panel) audio. The protocol facilitates the service focus and the ACP MCU to cooperate in implementing breakout rooms with PSTN (public-switched telephone network) audio. The C3P requests described are from the focus to (ACP) MCU only, are not issued by clients, and the focus will not distribute the requests to multiple MCUs.

To implement the functionality of sidebar (or breakout) rooms, multiple mixing groups can be created on the ACP (one per room) and designate the current mixing group (room) for each user's audio endpoint. To get this effect, the conference-info schema notion of sidebars can be used. A new sidebar is created for each breakout room. When moving endpoints from room to room, the "main" room can be regarded as a special-case sidebar, with a distinguished name.

For the management of sidebars, a subset of the already-defined C3P sidebar commands (e.g., AddSidebar, DeleteSidebar) can be utilized. For the manipulation of endpoints, the already-defined MoveUserToSidebar request can be used, but specifying a simpler effect on the conference state by modifying the affected endpoint in place, rather than moving the media children into the sidebars-by-val section of the conference document.

To implement breakout rooms with ACP audio, two items are specified: the C3P requests (e.g., in the C3P schema), and effect on the conference state (in the C1 schema). C3P requests from the focus to the ACP MCU are used for these operations: create and delete ACP sidebars, and move ACP endpoints to/from sidebars.

The service focus generates these requests and parses the responses. The ACP MCU parses (and implements) the requests, and generates the responses. It is assumes that a "success" response does not mean that the requested action has already taken place; rather it means "I've received your apparently valid request, and will act on it shortly." Reliance is on notifications for confirmation that the operation really took effect.

To create and delete sidebars, the already-defined AddSidebar and DeleteSidebar requests and corresponding responses can be used. To move endpoints, the already-defined MoveUserToSidebar request can be used.

C3P notifications (from ACP MCU to focus) are used to indicate changes in the (ACP) conference state when the ACP MCU adds or removes sidebars and ACP endpoints move from one sidebar to another.

The ACP MCU generates these notifications, and the service focus parses and interprets the notifications. When the ACP MCU creates or deletes sidebars, the already-defined notifications are generated that add or remove sidebar entry children in the sidebars-by-val element of conference-info. Note that these sidebar entry elements will contain, at most, a conference-description element; will not contain a users element, and will not contain user or endpoint descendents.

When the ACP MCU acts on a MoveUserToSidebar request—that is, the ACP starts mixing an endpoint phone audio in a different sidebar group—the MCU will generate a notification updating the appropriate endpoint. The affected endpoint contains a current-sidebar child specifying the endpoint's current sidebar.

The more general proposal for sidebar operations described above addresses clients that can direct sidebar requests to the focus (e.g., to be forked to all MCUs), or to a specific MCU. Forking such a request raises the issue of aggregating the various responses from all the MCUs. This can be avoided by originating requests only at the server, specifically directed from the focus to the ACP MCU.

AddSidebar is the C3P request that creates a sidebar. This command creates state in the MCU to represent the new sidebar (breakout room), but does not move any users into that breakout room. This allows the MCU to prepare for future sidebar operations including preparing any necessary internal data structures.

Each sidebar has a unique identifier (the sidebar entity) as well as a user friendly display name. The unique ID is unique (within the conference instance) for each AddSidebar command. Duplicates are rejected with a failure response. A synopsis of AddSidebar command follows:

addSidebar(confEntity, sidebarEntity, displayText)

The focus sends an <addSidebar> request to the MCU, the MCU sends a response to the focus indicating success or failure, and if success, the MCU sends a notify to the focus adding to the sidebar entry.

The AddSidebar request creates a new sidebar in the specified conference. For the ACP MCU, each new sidebar represents a new audio mixing group (phone subconference). Sidebars must be created by AddSidebar before users can be moved into them. The confEntity must name an existing conference in the MCU. The sidebarEntity must be non-empty, and must not match any existing sidebar in that conference. Although the request's sidebar-info has the full conference-type, anything other than conference-description/display-text will be ignored. The form of C3P request can be the following:

```
<addSidebar>
    <conferenceKeys confEntity="confEntity"/>
    <sidebar-info entity="sidebarEntity">
        <conference-description>
            <display-text>displayText</display-text>
        </conference-description>
    </sidebar-info>
</addSidebar>
```

The following code shows the effect on conference-info:

```
<conference-info entity="confEntity" state="partial" ...>
    <sidebars-by-val state="partial">
        <entry entity="sidebarEntity" state="full">
            <conference-description>
                <display-text>displayText</display-text>
            </conference-description>
        </entry>
    </sidebars-by-val>
</conference-info>
```

Failure reasons include the following:

conferenceDoesntExist: confEntity fails to name a conference on the MCU sidebarExistsAlready: sidebarEntity names an existing sidebar in the conference Following is an example of the AddSidebar command.

```
<request requestId="1" from="focus" to="acp">
    <addSidebar>
        <conferenceKeys confEntity="confURI"/>
        <sidebar-info entity="room1">
            <conference-description>
                <display-text>Breakout Room 1</display-text>
            </conference-description>
        </sidebar-info>
    </addSidebar>
</request>
<response requestId="1" from="acp" to="focus" code="success">
    <addSidebar>
        <sidebarKeys confEntity="confURI" sidebarEntity="room1" />
    </addSidebar>
</response>
<notify notificationId="33" from="acp" to="focus">
    <conference-info entity="confURI" state="partial" version="42">
        <sidebars-by-val state="partial">
            <entry entity="room1">
                <conference-description>
                    <display-text>Breakout Room 1</display-text>
                </conference-description>
            </entry>
        </sidebars-by-val>
    </conference-info>
</notify>
```

DeleteSidebar is the C3P request that deletes a sidebar. The MCU deletes its representation of the sidebar and notifies the focus accordingly. Users that were in that sidebar are moved back to the "main" room. Following is a synopsis of the DeleteSidebar command.

deleteSidebar(confEntity, sidebarEntity)

The focus sends a <deleteSidebar> request to the MCU, the MCU sends a response to the focus indicating success or failure, and if success, the MCU sends a notify to the focus deleting the sidebar entry. The DeleteSidebar request deletes a sidebar in the specified conference. User endpoints currently in the designated sidebar are moved back in the "main" conference mix. The confEntity names an existing conference in the MCU. The sidebarEntity names an existing sidebar in that conference. The form of the C3P request is as follows:

```
<deleteSidebar>
    <sidebarKeys confEntity="confEntity"
 sidebarEntity="sidebarEntity"/>
    </deleteSidebar>
```

Effect on conference-info is as follows:

```
<conference-info entity="confEntity" state="partial" ...>
    <sidebars-by-val state="partial">
        <entry entity="sidebarEntity" state="deleted"/>
    </sidebars-by-val>
</conference-info>
```

Failure reasons:

conferenceDoesntExist: confEntity fails to name a conference on the MCU sidebarDoesntExist: sidebarEntity fails to name a sidebar in the conference Following is an example of the DeleteSidebar command.

```
<request requestId="2" from="focus" to="acp">
    <deleteSidebar>
        <sidebarKeys confEntity="confURI" sidebarEntity="room1" />
    </deleteSidebar>
</request>
<response requestId="2" from="acp" to="focus" code="success">
    <deleteSidebar>
        <sidebarKeys confEntity="confURI" sidebarEntity="room1" />
    </deleteSidebar>
</response>
<notify notificationId="34" from="acp" to="focus">
    <conference-info entity="confURI" state="partial" version="43">
        <sidebars-by-val state="partial">
            <entry entity="room1" state="deleted"/>
        </sidebars-by-val>
    </conference-info>
</notify>
```

The MoveUserToSidebar C3P request directs the MCU to mix the media of the specified user's endpoint in the specified sidebar. The empty string (as sourceSidebarEntity or targetSidebarEntity) designates the "main" room. Thus, an endpoint can be moved from the main room to a breakout room, an endpoint can be moved from one breakout room to another, and an endpoint can be moved from a breakout room back to the main room.

An endpoint may belong to only one sidebar at a time. By default, endpoints are placed in the main room (not a sidebar) when first connected. A synopsis of the moveUserToSidebar command follows:

```
moveUserToSidebar(confEntity, userEntity,
    targetSidebarEntity[sourceSidebarEntity])
```

The focus sends a <moveUserToSidebar> request to the MCU, the MCU sends a response to the focus indicating success or failure, and if success, the MCU sends a notify to the focus updating user/endpoint/current-sidebar.

The moveUserToSidebar request moves a user's ACP endpoint into the mixing group of a designated sidebar. In this request, the empty string (as targetSidebarEntity or sourceSidebarEntity) designates the main conference. The confEntity must name an existing conference in the MCU. The targetSidebarEntity must name an existing sidebar in that conference, or should be empty (to name the main conference). The sourceSidebarEntity, if specified, must likewise name an existing sidebar or the main conference.

The sourceSidebarEntity attribute is optional. If sourceSidebarEntity is provided, the request fails unless the user's endpoint is currently in the designated source.

If the request succeeds in moving the user's endpoint, that user's endpoint in the MCU's conference-info changes so that it has a current-sidebar child whose value is targetSidebarEntity. (If targetSidebarEntity is empty, current-sidebar may be absent; that is, if the endpoint is in the main conference, an empty current-sidebar and an absent current-sidebar are equivalent.)

Although the current-sidebar change could in principle be expressed as a partial endpoint update, we expect the MCU to send a new full endpoint, since a system-wide convention that MCUs never send partial endpoints in notifications. The form of the C3P request is as follows:

```
<moveUserToSidebar targetSidebarEntity="targetSidebarEntity"
    sourceSidebarEntity="sourceSidebarEntity">
    <userKeys confEntity="confEntity" userEntity="userEntity"/>
</moveUserToSidebar>
```

Effect on conference-info:

```
<conference-info entity="confEntity" state="partial" ...>
    <users state="partial">
        <user entity="userEntity" state="partial">
            <endpoint entity="endpointEntity">
                ...
                <current-sidebar>targetSidebarEntity</current-sidebar>
                ...
            </endpoint>
        </user>
    </users>
</conference-info>
```

Failure reasons:

conferenceDoesntExist: confEntity fails to name a conference on the MCU userDoesntExist: userEntity fails to name a user in the conference sourceSidebarDoesntExist: sourceSidebarEntity fails to name a sidebar in the conference targetSidebarDoesntExist: targetSidebarEntity fails to name a sidebar in the conference userNotInSourceSidebar: the specified user is not in the specified source Example of the moveUserToSidebar command:

```
<request requestId="3" from="focus" to="acp">
    <moveUserToSidebar targetSidebarEntity="room1">
        <userKeys confEntity="confURI" userEntity="userURI"/>
    </moveUserToSidebar>
</request>
<response requestId="3" from="acp" to="focus" code="success">
    <moveUserToSidebar targetSidebarEntity="room1">
        <userKeys confEntity="confURI" userEntity="userURI"/>
    </moveUserToSidebar>
</response>
<notify notificationId="35" from="acp" to="focus">
    <conference-info entity="confURI" state="partial" version="44">
        <users state="partial">
            <user entity="userURI" state="partial">
                <endpoint entity="tel:1-900-USER4">
                    <status>connected</status>
                    <joining-method>dialed-out</joining-method>
                    <current-sidebar>room1</current-sidebar>
                    <media id="0">
                        <type>phone-conf</type>
                        <label>main-phone-conf</label>
                        <status>sendrecv</status>
                    </media>
                </endpoint>
            </user>
        </users>
    </conference-info>
</notify>
```

Following is an example of a C3P schema.

```
<!-- ADD SIDEBAR TYPE -->
<xs:complexType name="add-sidebar-type">
    <xs:sequence>
        <xs:element name="conferenceKeys" type="tns:conference-keys-type" />
        <!-- Sidebar information -->
        <xs:element name="sidebar-info" type="ci:conference-type" />
        <xs:any namespace="##other" processContents="lax" minOccurs="0" maxOccurs="unbounded" />
    </xs:sequence>
    <xs:anyAttribute namespace="##other" processContents="lax" />
</xs:complexType>
<!-- ADD SIDEBAR RESPONSE TYPE -->
<xs:complexType name="add-sidebar-response-type">
    <xs:sequence>
        <xs:element name="sidebarKeys" type="tns:sidebar-keys-type" minOccurs="0" />
        <xs:any namespace="##other" processContents="lax" minOccurs="0" maxOccurs="unbounded" />
    </xs:sequence>
    <xs:attribute name="reason" type="tns:add-sidebar-reason-code-type" use="optional" />
    <xs:anyAttribute namespace="##other" processContents="lax" />
</xs:complexType>
<!-- ADD SIDEBAR REASON CODE TYPE -->
<xs:simpleType name="add-sidebar-reason-code-type">
    <xs:restriction base="xs:string">
        <xs:enumeration value="conferenceDoesntExist" />
        <xs:enumeration value="sidebarExistsAlready" />
        <xs:enumeration value="otherFailure" />
    </xs:restriction>
</xs:simpleType>
<!-- DELETE SIDEBAR TYPE -->
<xs:complexType name="delete-sidebar-type">
    <xs:sequence>
        <xs:element name="sidebarKeys" type="tns:sidebar-keys-type"/>
        <xs:any namespace="##other" processContents="lax" minOccurs="0" maxOccurs="unbounded" />
    </xs:sequence>
    <xs:anyAttribute namespace="##other" processContents="lax" />
</xs:complexType>
<!-- DELETE SIDEBAR RESPONSE TYPE -->
<xs:complexType name="delete-sidebar-response-type">
    <xs:sequence>
        <xs:element name="sidebarKeys" type="tns:sidebar-keys-type" minOccurs="0" />
        <xs:any namespace="##other" processContents="lax" minOccurs="0" maxOccurs="unbounded" />
    </xs:sequence>
    <xs:attribute name="reason" type="tns:delete-sidebar-reason-code-type" use="optional" />
    <xs:anyAttribute namespace="##other" processContents="lax" />
</xs:complexType>
<!-- DELETE SIDEBAR REASON CODE TYPE -->
<xs:simpleType name="delete-sidebar-reason-code-type">
    <xs:restriction base="xs:string">
        <xs:enumeration value="conferenceDoesntExist" />
        <xs:enumeration value="sidebarDoesntExist" />
        <xs:enumeration value="otherFailure" />
    </xs:restriction>
</xs:simpleType>
<!-- MOVE USER TO SIDEBAR TYPE -->
<xs:complexType name="move-user-to-sidebar-type">
    <xs:sequence>
        <xs:element name="userKeys" type="tns:user-keys-type" />
        <xs:any namespace="##other" processContents="lax" minOccurs="0" maxOccurs="unbounded" />
    </xs:sequence>
    <xs:attribute name="sourceSidebarEntity" type="xs:anyURI" use="optional" />
    <xs:attribute name="targetSidebarEntity" type="xs:anyURI" use="optional" />
    <xs:anyAttribute namespace="##other" processContents="lax" />
</xs:complexType>
<!-- MOVE USER TO SIDEBAR RESPONSE TYPE -->
<xs:complexType name="move-user-to-sidebar-response-type">
    <xs:sequence>
        <xs:element name="userKeys" type="tns:user-keys-type" minOccurs="0" />
        <xs:any namespace="##other" processContents="lax" minOccurs="0" maxOccurs="unbounded" />
    </xs:sequence>
    <xs:attribute name="reason" type="tns:move-user-to-sidebar-reason-code-type" use="optional" />
    <xs:attribute name="sourceSidebarEntity" type="xs:anyURI" use="optional" />
    <xs:attribute name="targetSidebarEntity" type="xs:anyURI" use="optional" />
    <xs:anyAttribute namespace="##other" processContents="lax" />
</xs:complexType>
<!-- MOVE USER TO SIDEBAR REASON CODE TYPE -->
<xs:simpleType name="move-user-to-sidebar-reason-code-type">
    <xs:restriction base="xs:string">
        <xs:enumeration value="conferenceDoesntExist" />
        <xs:enumeration value="userDoesntExist" />
        <xs:enumeration value="sourceSidebarDoesntExist" />
        <xs:enumeration value="userNotInSourceSidebar" />
        <xs:enumeration value="targetSidebarDoesntExist" />
        <xs:enumeration value="otherFailure" />
    </xs:restriction>
</xs:simpleType>
<!-- SIDEBAR KEYS TYPE -->
<xs:complexType name="sidebar-keys-type">
    <xs:attribute name="confEntity" type="xs:anyURI" />
    <xs:attribute name="sidebarEntity" type="xs:anyURI" />
    <xs:anyAttribute namespace="##other" processContents="lax" />
</xs:complexType>
```

In the conference-info schema, the current-sidebar element is added to endpoint-type.

```
<!--
    ENDPOINT TYPE
-->
<xs:complexType name="endpoint-type">
    <xs:sequence>
        <xs:element name="display-text" type="xs:string"
```

-continued

```
minOccurs="0"/>
        ... many other elements here, not shown ...
            <xs:element ref="msci:current-sidebar" minOccurs="0"/>
            <xs:sequence minOccurs="0">
                <xs:element ref="cis:separator"/>
                <xs:any namespace="##other" processContents="lax"
maxOccurs="unbounded"/>
            </xs:sequence>
        </xs:sequence>
        <xs:attribute name="entity" type="xs:string"/>
        <xs:attribute name="state" type="state-type"
use="optional" default="full"/>
        <xs:anyAttribute namespace="##other"
processContents="lax"/>
    </xs:complexType>
    <!--
        current sidebar
    -->
    <xs:element name="current-sidebar" type="xs:anyURI"/>
```

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
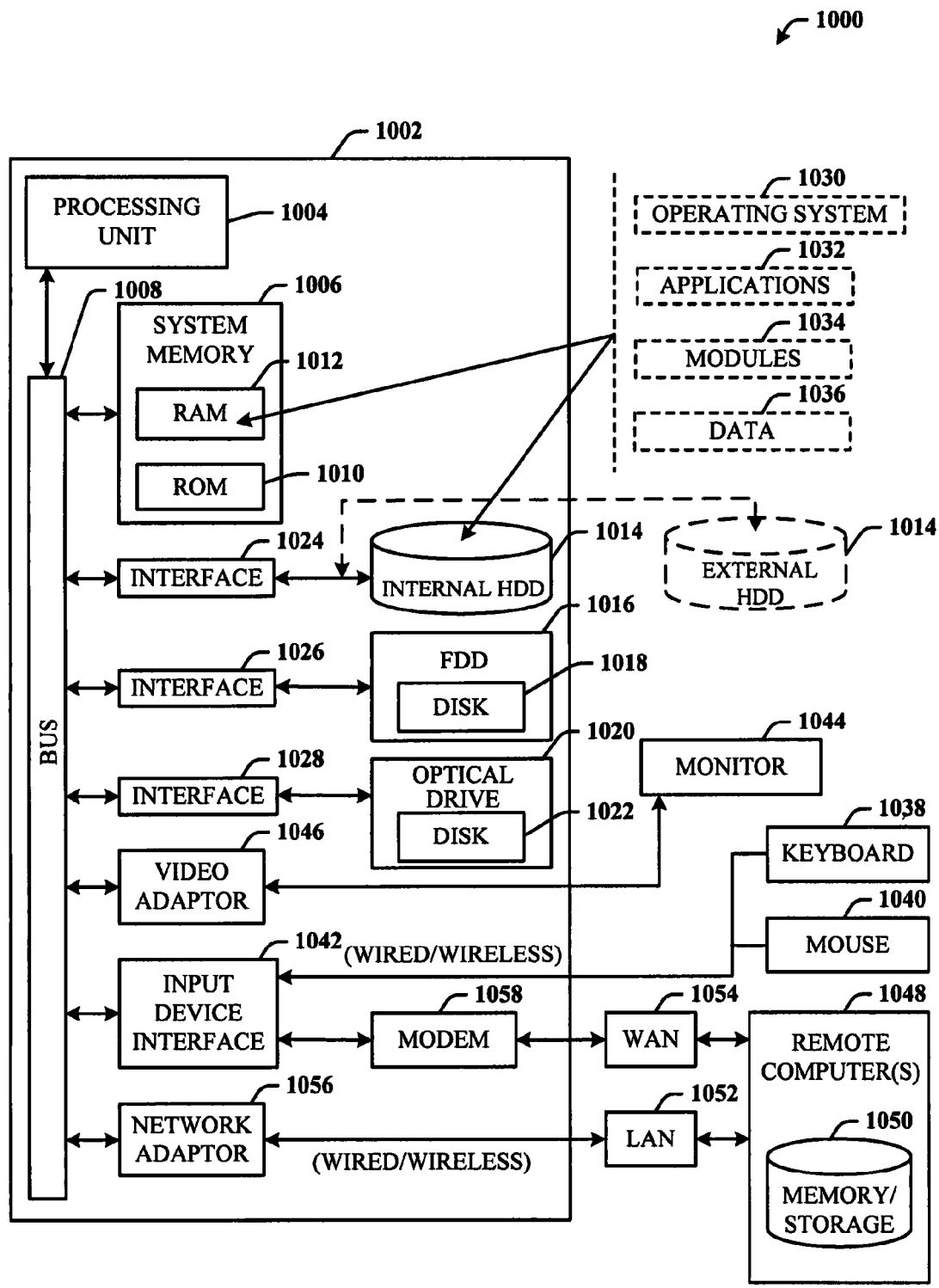
FIG. 10 illustrates a block diagram of a computing system operable to facilitate distributed conferencing in accordance with the disclosed architecture.

Referring now to FIG. 10, there is illustrated a block diagram of a computing system 1000 operable to facilitate distributed conferencing in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE; SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1012, including an operating system 1030, one or more application programs 1032, other program modules 1034 and program data 1036. The one or more application programs 1032, other program modules 1034 and program data 1036 can include the conferencing component 102, the protocol component 108, main and sidebar session functionality and, frontend software control and management, for example.

All or portions of the operating system, applications, modules, and/or data can also be cached in the RAM 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wire and/or wireless communication network interface or adapter 1056. The adaptor 1056 may facilitate wire or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

Figure 11:
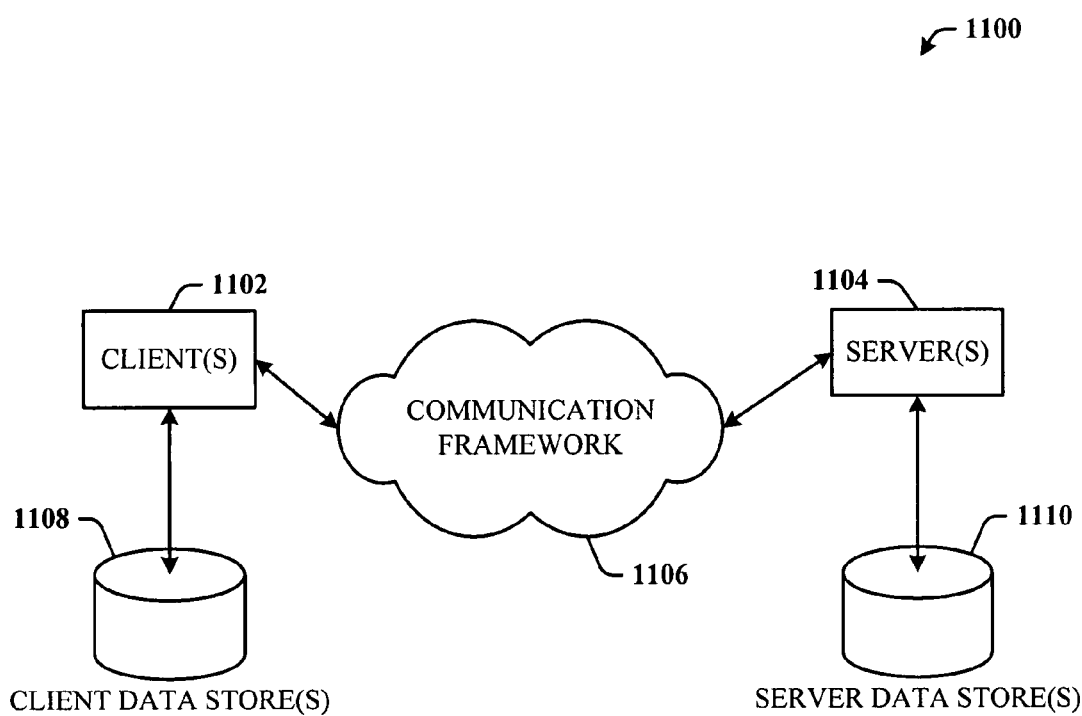
FIG. 11 illustrates a schematic block diagram of an exemplary computing environment that facilitates distributed conferencing.

Referring now to FIG. 11, there is illustrated a schematic block diagram of an exemplary computing environment 1100 that facilitates distributed conferencing. The system 1100 includes one or more client(s) 1102. The client(s) 1102 can be hardware and/or software (e.g., threads, processes, computing devices). The client(s) 1102 can house cookie(s) and/or associated contextual information, for example.

The system 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The clients 1102 can include the frontend systems, for example, and the servers 302 and 304 of FIG. 3, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented conferencing system, comprising:
   a conferencing component for creating sidebar sessions in a distributed conferencing environment having a distributed pool of frontend systems that handle different types of media access;
   a focus of the conferencing component for providing access to focus instances that run on each of the respective frontend systems, to connect to any other frontend system in the distributed pool, for management of local sessions and at least one of the sidebar sessions on the distributed pool of frontend systems;
   a protocol component for coordinating session control of the sidebar sessions across the distributed conferencing environment using a session protocol; and
   a processor that executes computer-executable instructions associated with at least one of the conferencing component or the protocol component.

2. The system of claim 1, wherein the session protocol is SIP (session initiation protocol).

3. The system of claim 1, further comprising a plurality of distributed control components for hosting the sessions and connecting participants to the sessions via at least one of data, audio media, video media, or messaging media.

4. The system of claim 3, wherein a control component includes the focus instance for managing the sidebar sessions.

5. The system of claim 1, wherein the protocol component facilitates creation of a sidebar session in a remote multi-point control unit (MCU).

6. The system of claim 1, wherein the protocol component facilitates deletion of a sidebar session in a remote MCU.

7. The system of claim 1, wherein the protocol component facilitates moving a user between the sidebar session and a main session in a remote MCU.

8. The system of claim 1, wherein the protocol component facilitates modification of sidebar session properties in a remote MCU.

9. The system of claim 1, wherein the protocol component facilitates implementation of audio control panel (ACP) audio in the sidebar session.

10. The system of claim 1, wherein the protocol component facilitates roaming of a session participant among the sidebar sessions of a remote MCU.

11. The system of claim 1, wherein the protocol component facilitates concurrent participation of a single user in at least two of the sidebar sessions.

12. A computer-implemented method of conferencing, comprising acts of:
   establishing a main session for conference participants in a distributed conferencing environment defined by a pool of distributed frontends that handle different types of media access;
   creating a sidebar session in a remote control unit from the pool of distributed frontends of the environment;
   coordinating session control of the sidebar session and the main session using a session protocol;
   providing access to interface instances for management of both the main session and the sidebar session by connecting to at least one of the respective distributed frontends using one of the interface instances; and
   utilizing a processor that executes instructions stored in memory to perform at least one of the acts of establishing, creating, coordinating, or providing.

13. The method of claim 12, further comprising partitioning the main session to create the sidebar session.

14. The method of claim 12, further comprising partitioning the main session into multiple sidebar sessions on the remote control unit.

15. The method of claim 12, further comprising allocating a second remote control unit from the pool of distributed frontend control units of the environment to host a second sidebar session created in association with the main session.

16. The method of claim 12, further comprising closing the sidebar session in response to moving all participants from the sidebar session.

17. The method of claim 12, further comprising moving a subset of the participants from the main session to the sidebar session.

18. The method of claim 12, wherein the session protocol includes SIP messages and C3P (centralized conference control protocol) commands.

19. The method of claim 12, further comprising notifying the conference participants of conference state associated with at least one of the main session or the sidebar session.

20. A computer-implemented system, comprising:
   computer-implemented means for establishing a main session for conference participants of a distributed conferencing environment defined by a pool of distributed frontends that handle different types of media access;
   computer-implemented means for creating a sidebar session in a remote control unit from the pool of distributed frontends of the environment;
   computer-implemented means for coordinating session control of the sidebar session using a session protocol;
   computer-implemented means for providing access to interface instances for management of both the main session and the sidebar session by connecting to at least one of the respective distributed frontends using one of the interface instances; and
   processor means that executes computer-executable instructions associated with at least one of the means for establishing, creating, coordinating, or providing.

* * * * *